United States Patent
Chliwnyj et al.

(10) Patent No.: US 6,305,629 B1
(45) Date of Patent: Oct. 23, 2001

(54) SERVO ERROR DETECTION OF BI-DIRECTIONAL REEL-TO-REEL TAPE DRIVES USING FINE LINE TACHOMETERS

(75) Inventors: Alex Chliwnyj; Colleen Renee Stouffer; Steven Carter Wills, all of Tucson, AZ (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/570,452

(22) Filed: May 12, 2000

(51) Int. Cl.[7] .................. B65H 59/38; G03B 21/50; G11B 15/46; G11B 23/42
(52) U.S. Cl. ................... 242/334.3; 242/334.1; 360/71
(58) Field of Search ............... 242/334.3, 334.1; 360/71, 73.14

(56) References Cited

U.S. PATENT DOCUMENTS

| | | | | |
|---|---|---|---|---|
| 4,125,881 | * | 11/1978 | Eige et al. | 360/50 |
| 4,398,227 | * | 8/1983 | Andersen | 360/71 |
| 4,739,950 | * | 4/1988 | Golea et al. | 242/334.3 |
| 5,032,938 | * | 7/1991 | Tajima et al. | 360/73.09 |

* cited by examiner

*Primary Examiner*—Christopher P. Ellis
*Assistant Examiner*—Jonathan R Miller
(74) *Attorney, Agent, or Firm*—Jim Pershon; Robert M Sullivan

(57) ABSTRACT

Servo errors can be avoided in a bi-directional reel-to-reel tape transport in which magnetic tape is moved in either of two opposite directions for data recording by providing a fine-line tachometer for each reel and a directly coupled tension sensor. Control of tape speed is implemented in a servo algorithm that uses tachometer inputs to determine parameter values for generating reel motor drive currents. If the linear velocity of both reels is the same then the tension output must be within a tolerable range. The directly coupled tension output provided an is indication of the actual current of the tension sensor. The difference between the linear velocities of the tape from each reel is calculated and monitored together with the tape tension. A trip level is set when an error occurs to stop tape motion and permit recovery without damaging the tape. The status of each outputs indicates the status of the tape velocity and whether the tape is slack or stretched on one reel which could cause a servo error which must be detected in order to prevent chopped blocks of data or data slivers. Motor problems may also be detected using the invention.

10 Claims, 3 Drawing Sheets

SERVO ERROR DETECTION OF BI-DIRECTIONAL REEL-TO-REEL TAPE DRIVES USING FINE LINE TACHOMETERS

FIELD OF THE INVENTION

This invention relates generally to motion and position of control of a web of magnetic tape in a reel-to-reel drive in which the web can be transported bi-directionally for recording and playback of information and more specifically to a servo error detection system for use therein.

BACKGROUND OF THE INVENTION

The control of magnetic tape motion and position in reel-to-reel tape drives is described in detail in U.S. Pat. Nos. 4,015,799, 4,125,881, and 5,576,905, all assigned to the assignee of this application and incorporated herein by reference in their entireties.

U.S. Pat. No. 4,015,799 relates to the use of the finely graduated, that is, a fine line tachometer on an idler roller engaging a magnetic tape to measure the amount of tape being advanced during a complete revolution of each tape reel shaft in a reel-to-reel tape drive system. The amount of tape advanced is converted to the radius of each reel once each revolution of the reel. Reel radius is then used to determine drive currents for each reel motor so as to provide a precise control of tape position and motion.

U.S. Pat. No. 4,125,881 describes a reel-to-reel tape drive in which magnetic tape is moved from one reel to the second reel, passing a read/write head mounted between the reels. A fine-line tachometer is mounted on one reel shaft to provide a fine-line tachometer reading in the form a number of pulses per revolution. A second tachometer on the second reel shaft provides a single pulse per revolution of the second reel. The single pulse is used to gate the counting of fine line tachometer pulses for each revolution of the second reel. A servo algorithm uses the gated-per revolution fine-line tachometer count to determine the real radii based upon the actual length and thickness of the magnetic tape whose position and motion the servo system controls. Motor acceleration currents of a magnitude corresponding to the real radii are generated to drive the reel motors.

Both of these incorporated patents are concerned with unidirectional tape drives in which magnetic tape is written and read in one direction. No recording occurs during movement of the tape in the opposite direction, which is used only for rewinding and repositioning the tape. However, in a bi-directional tape drive in which magnetic tape can be recorded in either direction the tape servo algorithm of these patents cannot accurately determine the radius of the tape reel and position of the data on the tape when the direction of tape writing is reversed. This problem was solved in the "905" patent.

U.S. Pat. No. 5,576,905 provided a compound solution to the problems of the first two patents by placing a fine-line tachometer on each drive motor for each reel of a reversible reel-to-reel tape drive. Each tachometer can include a single index line. In response to a signal conditioned to indicate the direction of motion for writing the tape, a fine-line output is selected from one of the tachometers fixed to the reel which is supplying the tape. When the direction in which data is being recorded or read is reversed, the roles of the tape reels reverse. Consequently, the source of the fine-line tachometer signal is switched to the tachometer on the motor driving the reel which is now supplying the tape. The provision of an index line on the tachometer on the motor which drives the reel solves the problem of positioning the reel which receives the tape leader block of the start of the tape. Once the threading notch is placed in the threading position, the tachometer is fixed to the shaft of the motor with its index mark at a known location. This provides a known correspondence between the index mark and the threading location in order to enable a threading servo to position the reel during all subsequent threading operations.

With the use of a bi-directional reel-to-reel tape drive, the servo control becomes very important because air could become entrapped on either reel and therefore the fine-line tachometer pulses now generated from the take-up reel would not correspond as accurately with the tape radius and tape position on the take-up reel. This is especially important since multiple data records on the tape are separated by inter-block gaps. The inter-block gaps (IBGs) are generated by timing the interval traveled between the records. A well controlled IBG has its size determined by the tape speed and the time interval. In order to maximize tape cartridge capacity, the size of the IBG is minimized.

When the writing process stops due to an interruption of data available from a host system or a write drive buffer, the tape drive must stop the tape and await the next write operation. Because of the very short length of the IBG and the relatively long stop and start distance required for the tape drive to accelerate, the tape drive motion servo system executes a "back hitch" in which tape motion is slowed following writing of the IBG, stopped, and then reversed back to a point where the read/write head precedes the location of the last written data. When the writing process begins again, the tape is accelerated from its stopped position up to a constant write velocity at which time the last data record and the IBG immediately following it has passed the read/write head and the next record is written.

In executing the back hitch operation, the position of the last written data recorded on the tape relative to the read/write head is controlled by the tape motion servo system by using the output of the fine-line tachometer and by measuring timing between the end of the last written data and a particular fine-line tachometer pulse. To start the back hitch, the data channel issues a synchronizing signal to the tape motion servo system indicating the end of the last data record. The tape motion servo system measures and stores the time lapse between the synchronizing signal and the next fine-line tachometer pulse which occurs. This pulse then becomes a position reference pulse. This time is subtracted from the desired IBG transit time to produce a time reference or partial IBG time for use in resynchronizing the recording channel circuits to the last data recorded on the tape. The fine-line tachometer pulses are counted for the purpose of locating the position reference pulse after the back hitch motion has been executed. When the position reference pulse is located, a write start point is achieved, and the tape motion servo system times out the remaining partial IBG time, issuing a resynchronization signal to the data channel when the time out is completed. The resynchronization signal thus occurs at the end of a nominal IBG distance from the previously written data record, and a new data record is appended.

The accuracy of the process of resynchronization during the back hitch operation is limited by the integrity of the fine-line tachometer pulses. In particular, the correspondence between the fine-line tachometer pulses and the position of the data on the tape relative to the read/write head is dependent on the radius of the tape stack. The tachometer pulses provide a measurement of the angular position of the reel which corresponds by radius to linear position of the tape. On the take-up reel, air entrapment increases the apparent radius of the tape stack, thereby compromising the integrity of the correspondence between the stack of tape on the reel and the reel hub.

The tape slack leads to tape mispositioning and tape damage. The tape mispositioning created either chopped IBG blocks or slivers of data. Manifestly, there is a need in a reversible reel-to-reel tape drive for solutions to the air entrapment problem and to the detection of servo anomalies that can cause these problems.

SUMMARY OF THE INVENTION

In the present invention, the dual fine-line system that makes it possible to calculate the velocity of each of the tape reels is used to detect errors. By calculating the velocity of each reel, normalized to its radius, it is possible to detect differences between the velocities of the supply and take-up reel. The difference in reel velocities is directly related to slack or air entrapped reels or stretched tape in the tape path. In the prior art, the drive relied upon the hardware to detect the error as a result of gross tension error persisting for a considerable length of time. A trip lever was set that would prevent tape damage only if the servo system stopped the motion and recovered prior to damaging the tape. The present invention detects any inter layer tape slip on a back hitch or during streaming that would result in an invalid tachometer position for the next write append or read operation. If the linear velocity of both of the reels is the same but the system is unable to control the tension, it is an indication that problems of loose tape are present. With the present invention, both criteria of the linear velocity and the tension must be met. The linear velocity must be the same within tolerances for both reels as well as the tension measured must be within a range. The linear velocity is measured in the present invention which is the reciprocal of the time and the radius ratio of the reels. The radius ratio provides the linear velocity. In this invention, the output of a tension transducer produces a tension current that is used to calculate a tension error for feedback to the control loop. The feedback will adjust the velocity of the reel to produce the correct tension, i.e., a tension error of zero. The magnitude of the tension error is not artificially limited to the control loop; therefore, the tension feedback will attempt to drive the velocity of the reels apart. The difference between the velocities of the reels and the tension error are limited to maintain control. The tension itself is not limited but what is limited is the linear velocity of both reels. The velocity is measured by using a fixed rate analog signal.

The present invention uses the fine-line tachometer on both reels to get the angular velocity of each reel in a manner shown in the "881" patent. This is then used to calculate the radius of each reel and the linear velocity is then calculated for the tape of each reel. The linear velocity is the reciprocal of the time and radius ratio of the reels. The radius ratio provides the linear velocity. Then the difference between the linear velocity of the tape from each reel is calculated. The linear velocity difference between each reel is monitored to obtain an indication of the error which caused the lost control of the tape between the reels. The differences between the linear velocity of each reel could also be integrated instead of using the output of the tension transducer to obtain the indication of the error. The tension transducer direct current is coupled to both motor drives in order to indicate exactly the current to limit the velocity of the reels. To control the velocity of the tape, the velocity of both reels must be changed. Thus the present invention uses the linear velocity calculation of both reels with the indication that the tension cannot be controlled, with the direct current of the tension transducer coupled to the motor controls to control the velocity of the tape by changing the velocity of both the supply reel and the take-up reel for the tape.

This invention computes the linear velocity at each reel from its radius ratio and the angular velocity derived from the reciprocal of the velocity counter for each motor. The velocity counter counts fixed frequency clock pulses as controlled by the fine-line tachometer. The linear velocity of the tape is measured at each reel at opposite ends of the tape path. The differential velocity, one velocity from the other, shows if tape is being placed into the tape path or taken away from the tape path. Using the closed loop tension control, the direct current tension on the tape is known. Two conditions signal that a situation has occurred when the control of the tape is lost. The two conditions are the linear velocity of each reel and the direct current output from the tape tension measuring system.

Therefore the principle object of this invention is to provide an improved web drive for a reversible reel-to-reel web drive which can accurately control web motion in both reels and web tension in both directions in a bi-directional reel-to-reel web drive.

Another object of the present invention is to use the linear velocity of both of the reels in a reel-to-reel tape drive together with the direct current from the tension transducer to control the velocity of the tape and thereby control the tape passing a read/write head.

The foregoing and other features and advantages of the invention will be apparent from the following more particular description of the preferred embodiment of the invention, as illustrated in the accompanying drawings.

DETAILED DESCRIPTION OF THE PREFERRED EMBODIMENT

Tape motion control as used herein connotes the specific procedures and apparatus described and incorporated in U.S. Pat. No. 4,125,881 in which control of the tape position and the motion in the reel-to-reel tape drive is implemented by a tape radius constant correspondent to the actual length and thickness of the tape. The tape radius constant is calculated in a servo algorithm for controlling rotation of both reels in the tape drive. The inputs to the servo algorithm are tachometer pulses obtained from tachometers which engage the reel motor drive shafts.

The present invention is based upon the critical realization that derived tape motion control parameter values using the fine-line tachometer pulses obtained from the reels failed to account for air entrapment in the reels which could result in the proper tension indication while the velocity of the tape is out of control. The solution provided by the present invention is to provide for the calculation of the linear velocity of the tape and the tension indication to conclude with the result that the tape on the reels are loose and include the air entrapment. For the present invention both the linear velocities of the tape from the reels must be the same as well as the tension current must be within the acceptable range. The present invention can best be understood with reference to FIG. 1.

Figure 1:
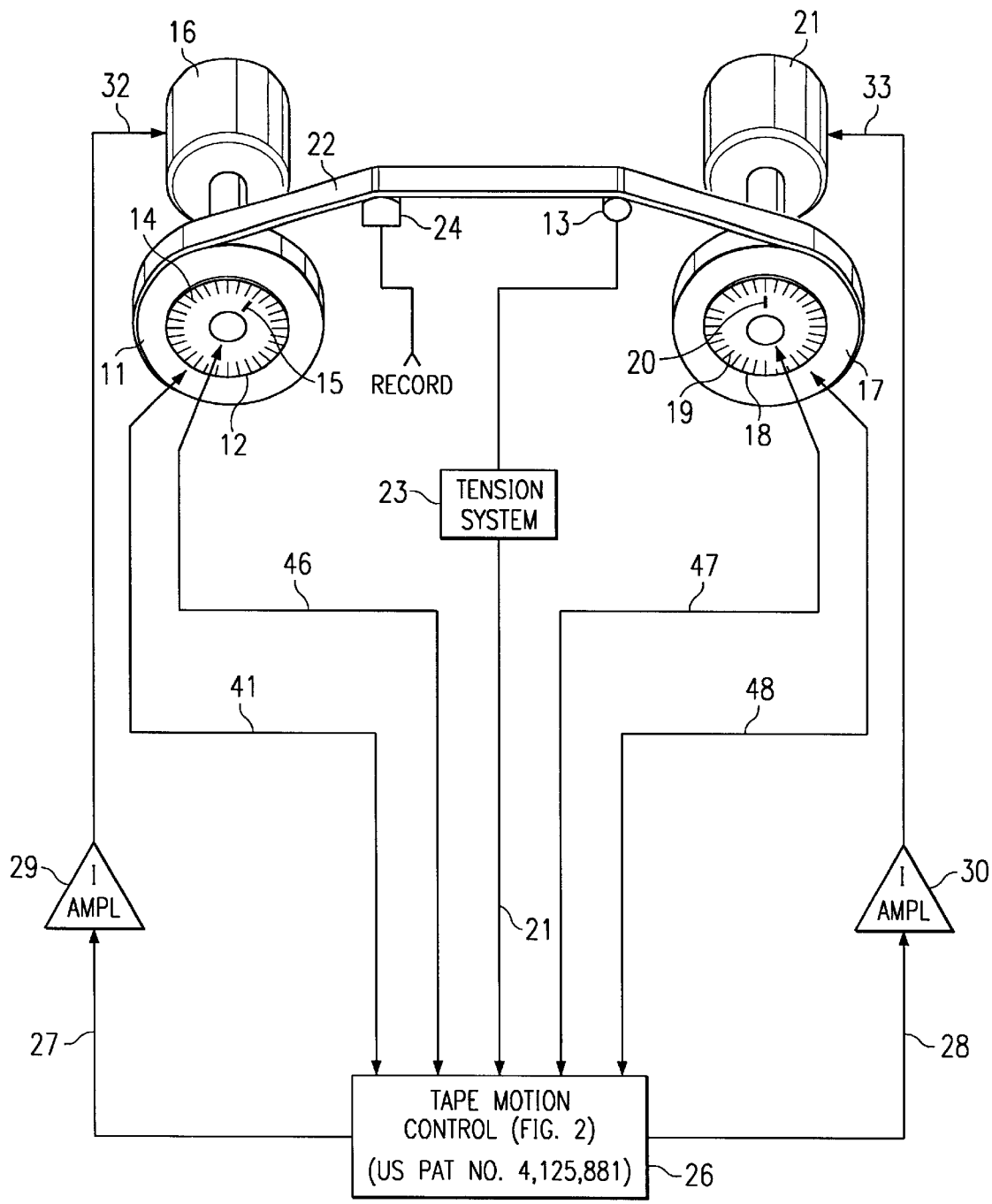
FIG. 1 is an overall block diagram of a tape motion control apparatus embodying the present invention.

Referring now to FIG. 1, a bi-directional reel-to-reel tape drive includes a pair of reels 11 and 17 each driven by respective motors 16 and 21. Mounted to the drive shafts of each of the motors 16 and 21 is a fine-line tachometer 12 and 18, respectively, with the outer circular array of fine-tachometer lines 14 and 19 and index lines 15 and 20, spaced radially inward on respective coding wheels on the fine-line array. A tape 22 is wound to the reels 11 and 17 and the motor 16 and 21 are controlled to move the tape for recording and playback in either of two directions.

Each of the tachometers 12 and 18 function as a tape motion sensor. Each tachometer emits a single pulse in response to an index mark to signify completion of a relatively large preselected angle preferably 360 degrees, that is, once per revolution of the reels 11 and 17. In addition, each of the tachometers 12 and 18 generates a two phase fine-line tachometer signal comprising two phase-displaced pulse streams. The fine-line tachometer arrays of the tachometer 12 and 18 are identical each emitting a number of pulses during each revolution of reels 11 and 17.

The tape 22 is advanced from one reel 11 to the second reel 17 for recording data through a magnetic read/write recording head 24 positioned between the reels 11 and 17. The reel 11 therefore is the "supply" reel while the reel 17 is the "take-up" reel. The tape 22 is partially wrapped around a free rolling tension transducer 13 in the path of the tape 22. The tension transducer 13 measures the tape tension force by any suitable means shown as a tension system 23 which could be a linear differential transformer in a manner known to those skilled in the art to provide a value of the actual tension of the tape while stretched between the reels The tension system 23 produces a direct which represents a desired reference tension. The output of the tension system 23 is directed along a line 21 to a control logic 26 for the control of the tape motion and will be described later in FIG. 2.

During advancement of the tape 22, various parameters, such as tape motion, position, and tension are monitored in order to derive motor currents having the polarity and magnitude necessary to operate the motors 16 and 21 while data is recorded on the tape 22. These currents are derived by the algorithm of the incorporated "881" patent in response to fine-line tachometer and index signals which are fed to the tape motion control unit 26. The tape motion control unit 26 processes the fine-line and index pulses thereby generating currents for the motors 16 and 21 on respective current lines 27 and 28. The signals on the current lines 27 and 28 are amplified by amplifiers 29 and 30, respectively, and the amplified motor currents are directed to the motors 16 and 21 on the lines 32 and 33. The tape motion control unit 26 operates to maintain the motors 16 and 21 at a constant nominal velocity for recording, reading and searching. The fine-line tachometer pulses from the tachometer 12 of reel 11 are directed along line 41 to the tape motion control unit 26. The pulses from the index line 15 of the tachometer 12 is directed along a line 46 to the tape motion control unit 26. Likewise, the fine-line tachometer pulses from the tachometer 19 of reel 17 is directed along a line 48 to the tape motion control 26. The index pulse from the tachometer 19 is directed along the line 47 to the tape motion control 26.

The tape motion control unit 26 logically derives samples of supply reel and take-up reel radii. The motion control unit 26 uses the three variables, the supply and take-up reel radii as well as the tension currents to derive the proper error correction currents for the supply and take-up reel motors. Reference is made to U.S. Pat. No. 4,015,799 for a discussion of the driving system for a reel-to-reel tape transport apparatus In the "799" patent, tachometers are used to obtain the motor current algorithm that is then utilized to generate the appropriate torque for each reel. The reel-to-reel tape drive has a static and dynamic performance characteristics which are independent of the reel radius and inertia changes resulting from tape motion.

Further reference is made to a U.S. Pat. No. 4,125,881 issued to Eige, et al on Nov. 14, 1978 and assigned to the assignee of the present invention. In this patent a fine-line tachometer is obtained in order to find the tape radius tape constant which corresponds to the actual length and thickness of tape in the system. The tape radius constant is calculated during the initial wrap of tape onto the take-up reel. then tension is tightly controlled by an analog tension sensor and servo system. The output of the fine-line tachometer determines the radius of both reels which can be derived repeatedly for adaptively modifying the drive current to both motors as the radius of each reel and hence its inertia changes. Further reference is made to U.S. Pat. No. 5,576,905 issued on Nov. 19, 1996 to Garcia, et al and assigned to the assignee of the present invention. In this patent, the control of tape position is implemented in a servo algorithm that uses the tachometer input to determine parameter values for generating the reel motor drive currents. The information in all three of these patents is incorporated into the present invention for a more thorough description of the drive mechanism using the tachometer and tension input in order to control the motors of a reel-to-reel transport system.

Figure 2:
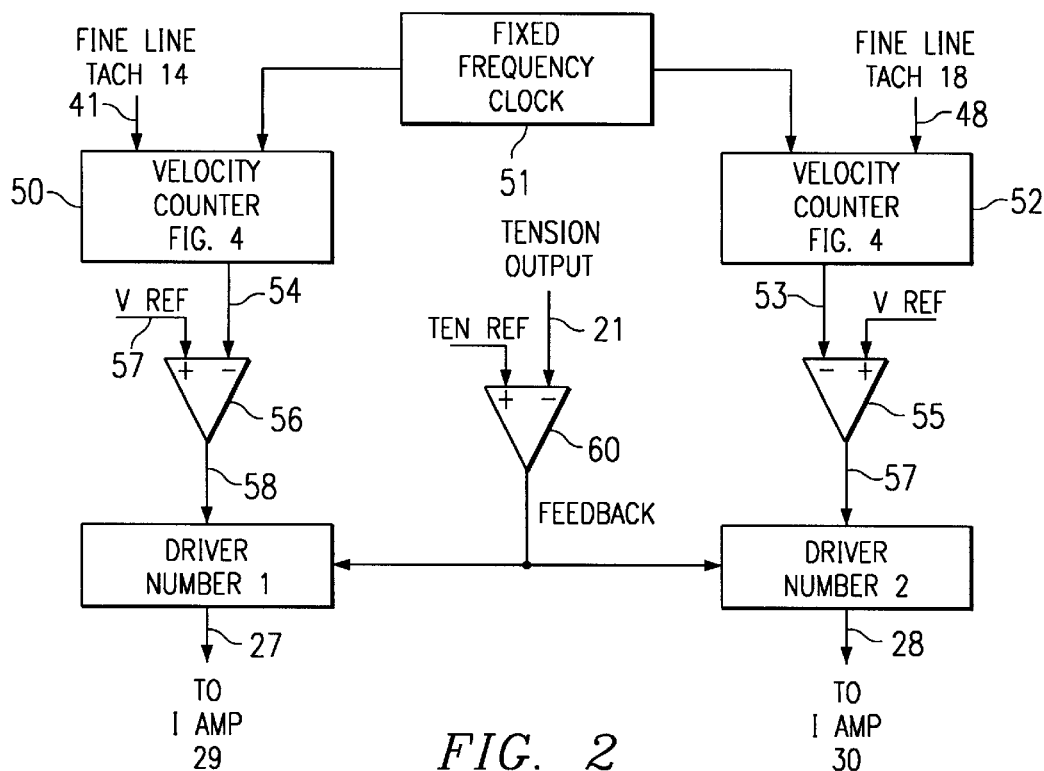
FIG. 2 is a block diagram of the motion control logic of FIG. 1.
Figure 4:
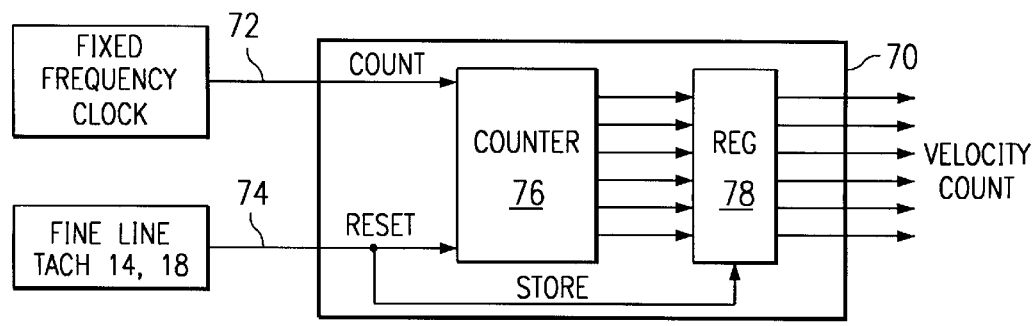
FIG. 4 is a detailed logic diagram of the velocity counter of FIG. 2.

Still referring to FIG. 2, some details of the tape motion control are shown and should be combined with the details of the "881" patent. A velocity counter 50 keeps a count of fixed frequency clock pulses from a fixed frequency counter 51 that occur between fine-line tachometer 14 pulses emitting from tachometer 12 along line 41. A further description of the velocity counter 50, as well as a velocity counter 52 is shown in FIG. 4 and will be described later.

The velocity counter 50 count is directed along a line 54 to a low pass filter 56 where the count is compared to a velocity reference number V REF directed along line 57. The velocity counter 50 measures the period between the tachometer pulses and gives the reciprocal of the velocity from which the velocity of the reel 11 can be determined. The output of the low pass filter 56 is directed along line 58 to driver #1. Driver #1 has its output directed along line 27 to control the rotational speed of the motor 16 via I amplifier 29, see FIG. 1.

The velocity counter 52 measures the period between the fine-line tachometer pulses from the tachometer 18. The fine-line pulses are directed along the line 48 from the tachometer 18 of reel 17. The velocity counter 52 provides the reciprocal of the velocity of the reel 17 and from this the velocity of reel 17 can be determined. The output of the velocity counter 52 is directed along a line 53 to a low pass filter 55. The output of the low pass filter 55 is directed Is along a line 57 to a motor driver #2. Driver #2 has its output directed along the line 28 to control the rotational speed of the motor 21 through its I amplifier 30, see FIG. 1.

A feedback loop is also directed to the drivers #1 and #2 from a low pass filter 60. The feedback loop is the comparison of the tension output taken along line 21 from the tension system 23 and the tension detector 13. The output of the tension detector is compared with a tension reference signal TEN REF also directed to the low pass filter 60. This current output directly coupled from the tension system 23 controls the rotational speed of both motors by controlling the current applied to each motor through their drivers.

Figure 3:
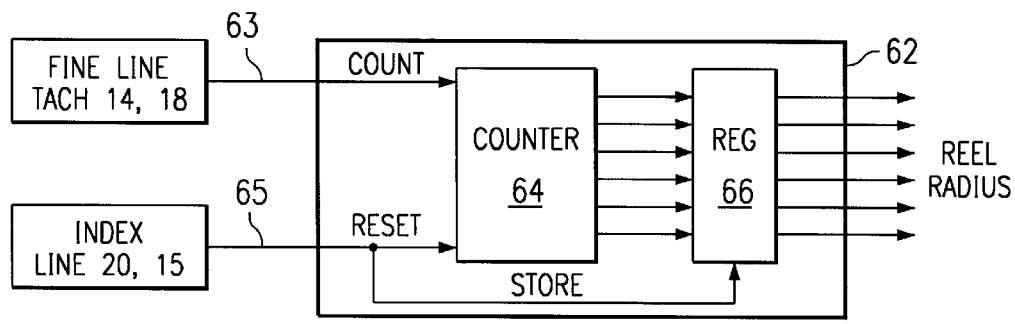
FIG. 3 is a detailed logic diagram of the reel radius counter of FIG. 2.

Referring now to FIG. 3, the radius of the tape on both reels 11 and 17 is derived by comparing the output of the digital reel tachometers 12 and 18 mounted on the motor shafts of motors 16 and 21 with the output of the once around index pulses of index lines 15 and 20. One reel counter 62 is shown in FIG. 3 but in effect two identical counters are provided, one to obtain the radius of the reel 11 and the second to obtain the radius of the reel 17. In each radius counter 62, a counter 64 is driven by the outputs of the fine-line tachometers 14 and 18 directed along a line 63. The index lines 15 and 20 directed to the counter 64 along line 65 reset the counter on one and each revolution of the reel. The output of the counter 64 is stored in the register once each revolution. Therefore, the count of each fine-line tachometer 14 and 18 is stored in the register once each revolution. This count is proportional to the instantaneous reel radius as shown in the "799" patent.

Referring now to FIG. 4, the velocity count pulses for each reel are obtained from a velocity counter 70, one for each reel 11 and 17. Only one velocity counter 70 is shown since both are identical. In the velocity counter, fixed frequency clock pulses as directed along a line 72 are counted that occur between the fine-line tachometer pulses online 74 obtained from fine-line tachometers 14 and 18. A counter 76 counts these pulses and 21) stores the count in a register 78. The output of the register 78 is the velocity count signals provided for velocity counter 53 and 54 of FIG. 2.

The fine-line tachometer 14 and 18 are 512 lines per revolution tachometers. The index pulses are emitted once each revolution of the reels. Each motor in the bi-directional system shown has both a fine-line and a once around tachometer outputs. By using the fine-line tachometer from the first motor and the once around of the second motor, the radius ratio can be calculated. By using the fine-line tachometer from the second motor and the once around index signal from the first motor, the radius ratio from the perspective of the second motor is obtained. One ratio should be the reciprocal of the other.

The velocity counter of FIG. 4 measures the period between tach pulses which is the reciprocal of the velocity. The calculation that converts the velocity counter value to a velocity is shown below. The velocity counter counts the number of pulses from a fixed clock that occur between the pulses from the fine-line tachometer. The resultant count is the reciprocal of the velocity. The faster the revolution of the motor, the fewer counts are obtained between the fine-line tachometer pulses. A division by the radius in assembly language provide the true angular velocity. The linear velocity of the tape at the reel is obtained. The calculation is performed for each reel.

```
/***************************************************************/
/* The following code computes:                                */
/*     (256/velocity.count, or 128/velocity.count)             */
/*     and places the result in inv_count in Q15 format.       */
/***************************************************************/
temp2    = velocity.count;
if (temp2 < 256)      /* this IF scales the divide code for high speed */
{
    temp1 = 128;
    temp3 = 6074;
}
else
{
    temp1 = 256;
    temp3 = 3037;
}
asm("*      lacc _temp1, 16      "); /* load high ACC, and zero low ACC.  */
asm("*      rpt #15               "); /* repeat ensuing SUBC 16 times     */
asm("*      subc _temp2           "); /* conditional subtraction          */
asm("*      and #0000FFFFh        "); /* ACC &= 0 x 0000FFFF              */
asm("*      clrc SXM              "); /* clear sign extension mode        */
asm("*      sfr                   "); /* shift1 ACC right 1 bit           */
asm("*      sacl _inv_count       "); /* inv_count = low ACC              */
/*-----------------------------------------------------------------
** velocity_outboard is   256 * velocity in m/s.
** 3070 is (2 * Pi * fc * RFull/Nlines)
**---------------------------------------------------------------*/
velocity_outboard = QMult11(temp3, RQ[0] );
velocity_outboard = QMult15(velocity_outboard, inv_count );
temp2 = velocity_count_in;
if (temp2 < 256)      /* this IF scales the divide code for high speed */
{
    temp1 = 128;
    temp3 = 6074;
}
else
{
    temp1 = 256;
    temp3 = 3037;
}
asm("*  13 lacc _temp1, 16       "); /* load high ACC, and zero low ACC.  */
```

```
asm("*    rpt #15              ");  /* repeat ensuing SUBC 16 times  */
asm("*    subc __temp2          ");  /* conditional subtraction       */
asm("*    and #0000FFFFh        ");  /* ACC &= 0 x 0000FFFF           */
asm("*    clrc SXM              ");  /* clear sign extension mode     */
asm("*    sfr                   ");  /* shift1 ACC right 1 bit        */
asm("*    sacl __inv__count     ");  /* inv__count = low ACC          */
velocity_outboard = QMult11(temp3, RQ[0] );
velocity_outboard = QMult15(velocity_outboard, inv_count );
```

The system of the present invention provides a direct coupled control system for the tension control loop. In previous tape drives, the nominal tape tension was set by applying a fixed current to each motor as computed to be correct for the measured radius ratio. The servo loop controlled the alternating current portion of the tension. In this invention, the tension loop is directly coupled and measures and controls the current portion of the tension as well. Incorrect tension of the tape can be determined. The tension of the tape can be corrected in the present invention by controlling the linear velocity of the tape from each reel by controlling the speed of each motor.

Further, this invention computes the linear velocity at each reel from the radius ratio and derives the angular velocity from the reciprocal of the velocity counter as described above. Thus the linear velocity of the tape is measured at each reel at opposite ends of the tape path as the tape is leaving the reels. By reviewing the differential velocity, that is, subtracting one velocity from the other, the determination of whether tape is being placed into the path or taken from the path can be determined. This permits the control of the motors to prevent slack or stretched tape in the tape path.

By using the closed loop tension control, the direct coupled tension on the tape is known. With the present invention, two conditions are now used to control the tape. If the servo loop is not able to control the tape, a hardware failure could be the cause. The present invention has the ability to react by stopping the tape motion before the tape is damaged. Further, the reel of tape in the cartridge may contain loose wraps of tape. This was formerly difficult to detect and could cause damage to the tape. This invention detects the inability to control the tape and permits the stopping of the motors slowly to prevent tape damage. The tape can then be re-tensioned on the cartridge because the present invention signals that the tape is loose.

The thresholds for declaring an error according to the preferred embodiment of the present invention is defined as 24 counts using a 256 count per meter per second tachometer. That is equivalent to 0.09 M/sec. This condition must persist continually for 10 sequential samples. The sample rate in the reel-to-reel servo control loop is 1100 samples per second. Concurrently, the tension loop has to be unable to control the tension for a number of samples. In the preferred embodiment, the tension loop must be 1 ounce too high or too low for the same period. The nominal desired tension on the tape is 5 ounces.

Figure 5:
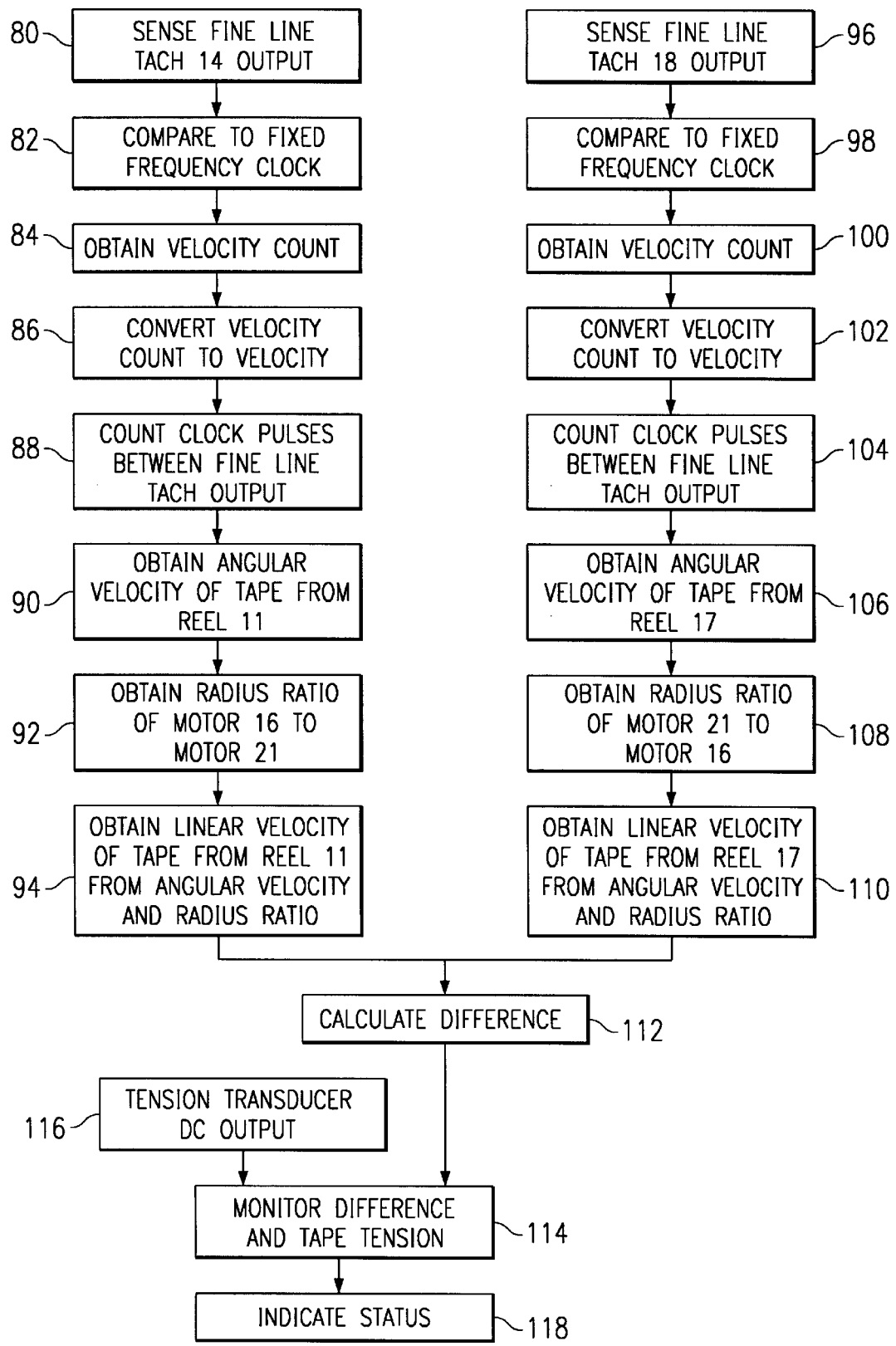
FIG. 5 is a flow diagram of the steps involved in the present invention.

Referring now to FIG. 5, a method is shown for performing the servo error detection of a bi-directional reel-to-reel tape drive using the fine-line tachometers and direct current tension system of the present invention. The program starts on one side by sensing the fine-line tachometer 14 output of motor 16 as shown in a block 80. The fine-line pulses are compared to a fixed frequency clock as shown in block 82 to obtain a velocity count as shown in block 84. In block 86, the velocity count is converted to the velocity indication. The fixed frequency clock pulses between the fine-line tachometer output are counted, block 88, and used to obtain the angular velocity of the tape from reel 11 as shown in block 90. The radius ratio of motor 16 to motor 21 is then determined in block 92. The linear velocity of the tape from reel 11 is obtained using the angular velocity and the radius ratio, see block 94.

At the same time, the fine-line tachometer 18 output is sensed as shown in block 96 for sensing the rotation of the reel 17. The fine-line tachometer 18 output is compared to the fixed frequency clock in block 98 to obtain a velocity count as shown in block 100. The velocity count is then converted to the velocity indication in block 102. The next step is to count the fixed frequency clock pulses that occur between the fine-line tachometer output as shown in block 104 in order to obtain the angular velocity of the tape at the reel 117, see block 106. The radius ratio of the motor 21 to motor 16 is obtained at block 108, and used with the angular velocity of the tape from reel 17 to obtain the linear velocity of the tape at reel 17 as shown in block 110. In block 112, the linear velocities of the tape at reels 11 and 17 are used to calculate the linear velocity difference. The differences in the linear velocity and the tension transducer direct current output for block 116 are monitored as shown in block 114 to indicate the performance of the reeling of the tape and the tension of the tape to find the status of the operation as shown in block 118. Any variance outside of a tolerance stops the reeling procedure to prevent a mistake in reading or writing of the tape and to prevent breakage or stretching of the tape or loose wraps of the tape on the reels.

While the preferred embodiments of the present invention have been illustrated in detail, it should be apparent that modifications and adaptations to those embodiments may occur to one skilled in the art without departing from the scope of the present invention as set forth in the following claims.

We claim:

1. An apparatus for controlling the motion of a magnetic tape in a tape drive, the apparatus including:

a first reel assembly for rotating in a first direction to supply a magnetic tape and for rotating in a second direction to take up the magnetic tape;

a second reel assembly for rotating in the first direction to take up magnetic tape supplied by the first reel assembly and for rotating in the second direction to supply magnetic tape to the first reel assembly;

a first fine-line tachometer coupled to the first reel assembly;

a second fine-line tachometer coupled to the second reel assembly;

a tape tension sensing device producing a directly coupled output for sensing the tension in the tape between the first reel assembly and the second reel assembly;

a control mechanism which is continually adaptive to dynamic changes as the tape is moved from the first reel assembly to the second assembly and continually adaptive to dynamic changes as the tape is moved from the second reel assembly to the first reel assembly;

said control mechanism including motion control logic means responsive to said first and second fine-line tachometers and the directly coupled output from said tape tension sensing device for calculating the appropriate rotation for each reel to drive the tape between the reels with a predetermined profile with negligible tape tension disturbances.

2. The apparatus of claim 1 wherein said control mechanism further provides continuous changes in reel motor acceleration and tension currents as the radii of the reels change.

3. In an apparatus for controlling the bi-directional motion of a web of material in a drive including a first reel assembly with a first fine-line tachometer attached thereto and a second reel assembly with an attached second fine-line tachometer with a web tension sensing device mounted in the tape path between the first reel assembly and the second reel assembly for sensing the tension in the web and a control mechanism which is continually adaptive to dynamic changes as the web is moved between the first and second reel assemblies, the improvement wherein said web tension sensing device produces a directly coupled output and said control mechanism includes motion control logic means responsive to said first and second fine-line tachometer and the direct current output from said web tension sensing device for calculating the appropriate rotation for each reel to drive the web between the reels with a predetermined profile with negligible web tension disturbances.

4. The apparatus of claim 3 further including a read/write magnetic head and wherein the web is a magnetic tape driven between the reel assemblies in a bi-directional reading and writing motion.

5. An apparatus for controlling the motion of a web of material in a web drive, the apparatus including:

a first reel assembly for rotating in a first direction to supply the web of material and for rotating in a second direction to take up the web of material;

a second reel assembly for rotating in the first direction to take up the web supplied by the first reel assembly and for rotating in the second direction to supply the web of material to the first reel assembly;

a first fine-line tachometer coupled to the first reel assembly;

a second fine-line tachometer coupled to the second reel assembly;

a web tension sensing device producing a direct current output for sensing the tension in the web between the first reel assembly and the second reel assembly;

a control mechanism for controlling the rotational speed of the first and second reel assemblies said control mechanism being continually adaptive to dynamic changes of the first and second fine-line tachometers and the directly coupled output of the web tension sensing device as the web is moved from the first reel assembly to the second assembly and continually adaptive to dynamic changes as the web is moved from the second reel assembly to the first reel assembly;

said control mechanism includes motion control logic means responsive to said first and second fine-line tachometer and the direct current output from said web tension sensing device for calculating the appropriate rotation for each reel to drive the web between the reels with a predetermined profile with negligible web tension disturbances.

6. The apparatus of claim 5 further including a read/write magnetic head and wherein the web is a magnetic tape driven between the reel assemblies in a bi-directional reading and writing motion.

7. A method for controlling motion and tension of a web of material as it is being transferred from one reel to a second reel, comprising the steps of:

sensing the output of a fine-line tachometer from both the first and second reels;

comparing the output from both fine-line tachometers to a fixed frequency clock to obtain a velocity count from both the first and second reels;

converting the velocity count from both the first and second reels to a velocity of the web at the reels;

counting the fixed frequency clock pulses between the fine-line tachometer outputs of both the first and second reels to obtain the angular velocity of the web at both the first and second reels;

obtaining the radius ratio between both the first and second reels;

obtaining the linear velocity of the web at the first reel from the angular velocity of the web at the first reel from the angular velocity of the web from the first reel and the radius ratio;

obtaining the linear velocity of the web at the second reel from the angular velocity of the web at the second reel from the angular velocity of the web from the second reel and the radius ratio;

obtaining the directly coupled output from a tension transducer;

monitoring the differences of the linear velocities from the first and second reel and the directly coupled output from the tension transducer; and indicating any error in the differences of the linear velocities between the first and second reels and any difference between the direct current output of the tension transducer and a reference current.

8. The method of claim 7 wherein the web is a magnetic tape driven between the first and second reel assemblies in a bi-directional reading and writing motion.

9. An article of manufacture for use in an apparatus for controlling the motion of a web of material in a web drive, the apparatus including a first reel assembly for rotating in a first direction to supply a web of material and for rotating in a second direction to take up the web of material, a second reel assembly for rotating in the first direction to take up the web of material supplied by the first reel assembly and for rotating in the second direction to supply the web of material to the first reel assembly, a first fine-line tachometer coupled to the first reel assembly, a second fine-line tachometer coupled to the second reel assembly, a web tension sensing device producing a directly coupled output for sensing the tension in the web between the first reel assembly and the second reel assembly, a control mechanism which is continually adaptive to dynamic changes as the web is moved from the first reel assembly to the second assembly and continually adaptive to dynamic changes as the web is moved from the second reel assembly to the first reel assembly, said control mechanism including motion control logic means responsive to said measuring means for calculating from said web position error and said inertia values the appropriate torque for each reel to drive said position error to zero along with a predetermined profile with negligible tape tension disturbances;

said article of manufacture in said control mechanism comprising a computer-readable storage medium tangibly embodying a program of executable computer instructions which may cause said apparatus to control the motion of the web of material, said article of manufacture to:

sense the output of a fine-line tachometer from both the first and second reels;

compare the output from both fine-line tachometers to a fixed frequency clock to obtain a velocity count from both the first and second reels;

convert the velocity count from both the first and second reels to a velocity of the web at the reels;

count the fixed frequency clock pulses between the fine-line tachometer outputs of both the first and second reels to obtain the angular velocity of the web at both the first and second reels;

obtain the radius ratio between both the first and second reels;

obtain the linear velocity of the web at the first reel from the angular velocity of the web at the first reel from the angular velocity of the web from the first reel and the radius ratio;

obtain the directly coupled output from a tension transducer;

monitor the differences of the linear velocities from the first and second reel and the direct current output from the tension transducer; and indicate any error in the differences of the linear velocities between the first and second reels and any difference between the directly coupled output of the tension transducer and a reference current.

10. The article of manufacture of claim 9 wherein the web is a magnetic tape driven between the first and second reel assemblies in a bi-directional reading and writing motion.

* * * * *